United States Patent

Frelund

[11] Patent Number: 4,601,196
[45] Date of Patent: Jul. 22, 1986

[54] ENGINE COMBUSTION CHAMBER PRESSURE SENSOR

[75] Inventor: Arthur R. Frelund, Okemos, Mich.

[73] Assignee: General Motors Corporation, Detroit, Mich.

[21] Appl. No.: 640,937

[22] Filed: Aug. 15, 1984

[51] Int. Cl.⁴ ............................................. G01L 23/22
[52] U.S. Cl. ..................................................... 73/115
[58] Field of Search ............ 73/35, 115; 123/425, 123/435

[56] References Cited

U.S. PATENT DOCUMENTS

| | | | |
|---|---|---|---|
| 3,939,703 | 2/1976 | Heggie | 73/115 |
| 4,153,019 | 5/1979 | Laubenstein et al. | 123/425 |
| 4,371,804 | 2/1983 | Peng et al. | 73/35 |
| 4,382,377 | 5/1983 | Kleinschmidt et al. | 73/35 |
| 4,399,706 | 8/1983 | List et al. | 73/115 |
| 4,408,479 | 10/1983 | Asai et al. | 73/35 |
| 4,408,483 | 10/1983 | Bollinger et al. | 73/115 |
| 4,450,709 | 5/1984 | Hayashi | 73/35 |

FOREIGN PATENT DOCUMENTS 3148452  7/1983  Fed. Rep. of Germany ...... 123/425

*Primary Examiner*—Stewart J. Levy
*Assistant Examiner*—John E. Chapman, Jr.
*Attorney, Agent, or Firm*—Robert J. Outland

[57] ABSTRACT

An engine mounted combustion chamber pressure sensor is arranged with a body mounted in an external wall, such as of the cylinder head, and a probe engaging a combustion chamber defining wall to provide direct indication of combustion pressure caused movements of the chamber defining wall with respect to the external wall, thus providing direct combustion pressure signals usable for indicating or control purposes.

11 Claims, 2 Drawing Figures

ENGINE COMBUSTION CHAMBER PRESSURE SENSOR

TECHNICAL FIELD

This invention relates to the application of combustion chamber pressure sensors in internal combustion engines.

BACKGROUND

It is known in the art relating to internal combustion engines to utilize pressure sensing devices to indicate the occurrence, magnitude and/or timing of combustion in one or more engine cylinders, or combustion chambers. A sensor may be selected from known devices, such as piezoelectric force rings, and applied together with a suitable indicating or control system as shown, for example, in U.S. Pat. No. 4,153,019 Laubenstein et al, assigned to the assignee of the present invention.

In practice, prior art cylinder pressure sensors have been mounted in various ways to obtain the desired pressure signal for subsequent use in an associated indicating or control system. A known application, referred to in U.S. Pat. No. 4,153,019, is to secure the force ring indicator to the engine by a cylinder head bolt which serves as the combustion pressure signal source. However, such applications are subject to other forces acting on the cylinder heads in addition to combustion pressure such as, for example, thermal expansion and external shock or inertia loads. These extraneous forces may vary, or otherwise adversely affect, the cylinder pressure indications sensed by the pressure sensor and, thus, may interfere with the proper operation of the system to which the cylinder pressure sensor is connected. It is therefore desirable to provide an engine combustion pressure sensor mounting arrangement which avoids or minimizes the application of extraneous forces to the cylinder pressure indications.

SUMMARY OF THE INVENTION

The present invention involves the application of an engine combustion pressure sensor in an engine cylinder head or comparable location in a manner that directly senses movements of the combustion chamber wall and converts them into cylinder pressure force signals which are relatively free from extraneous force readings. In particular, the invention involves the application of a piezoelectric or other suitable pressure sensor in engagement with two spaced walls, one of which is directly exposed to combustion chamber pressures and the other of which is not.

In a preferred example, the sensor is mounted in an outer wall of an engine cylinder head and has a probe extending into engagement with an inner cylinder head wall which defines a portion of the engine combustion chamber. Movement of the cylinder head defining wall in response to variations in combustion chamber pressure directly moves the sensor probe in relation to its body, mounted in the outer wall, and thereby provides a direct reading of variations in combustion chamber pressure. Alternative ways of applying a pressure sensor are contemplated.

These and other features and advantages of the invention will be more fully understood from the following description of certain preferred embodiments, taken together with the accompanying drawing.

BRIEF DRAWING DESCRIPTION

In the drawing:
FIG. 1 is a transverse cross-sectional view of a portion of an engine having combustion chamber pressure sensor means disposed in accordance with the invention; and FIG. 2 is a transverse cross-sectional view similar to FIG. 1 and showing an alternative embodiment and mounting of combustion pressure sensing means.

DETAILED DESCRIPTION

Figure 1:
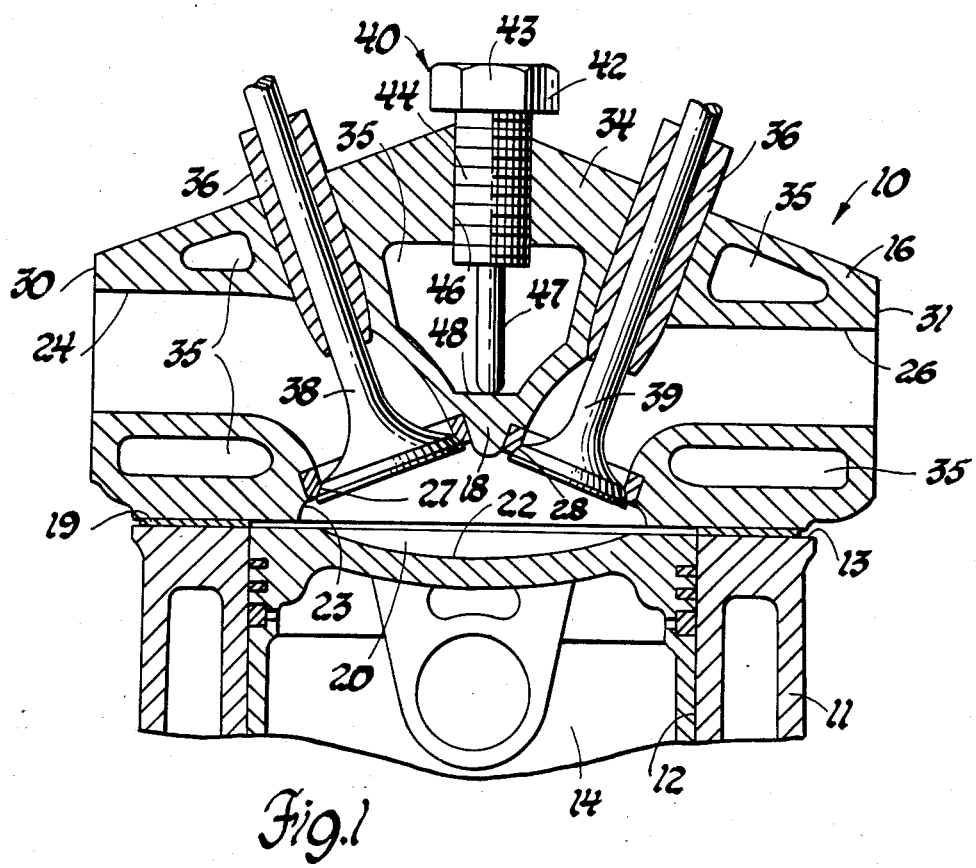

Referring first to FIG. 1 of the drawing, there is shown an internal combustion engine generally indicated by numeral 10. Engine 10 includes a cylinder block 11 having a plurality of cylinders 12, only one of which is shown opening through an upper wall 13. Pistons 14 are reciprocable within each of the cylinders and are conventionally connected with an engine output crankshaft not shown.

A cylinder head 16, carried by the block 11, has a lower wall 18 that is seated on the block upper wall 13. A gasket 19 seals the joint in conventional fashion. The cylinder head lower wall 18 extends over, and closes, the open end of each cylinder 12 to define, together with their respective pistons 14, combustion chambers 20. Each combustion chamber is partially defined by a dished recess 22 in the top of its piston and an opposing dome-like recess 23 in the cylinder head lower wall 18. The cylinder head further includes intake and exhaust ports 24, 26, respectively, which extend from valve seats 27, 28, respectively, on opposite sides of each combustion chamber recess, through opposite side walls 30, 31, respectively, of the cylinder head.

The portion of the combustion chamber recess 23 surrounding the valve ports and any other associated openings, such as for a spark plug, not shown, is defined by part of the lower wall 18 of the cylinder head. Wall 18 is spaced from a top wall 34 of the cylinder head which extends between the side walls 30, 31. A water jacket 35 occupies the open spaces within the cylinder head, such as around the intake and exhaust ports 24, 26 and above the combustion chamber defining portion of the lower wall 18. Valve guides 36, extending through the top wall 34 and into the ports 24, 26, carry intake and exhaust valves 38, 39 that seat on the valve seats 27, 28 respectively and are actuatable by valve gear, not shown, in conventional fashion.

In accordance with the invention, the engine 10 is provided with a piezoelectric sensor located at at least one cylinder location and generally indicated by numeral 40. Sensor 40 includes a main body 42 having a hexagonal head 43 and a threaded portion 44 extending from the head. Portion 44 is secured within a threaded opening 46 that extends through a central portion of the cylinder head top wall 34. The sensor further includes a probe 47 that extends axially from the lower portion of the body 42. The probe is connected internally with a known piezoelectric device which is operable to indicate relative axial motion between the probe 47 and the body 42. It should be understood that any known form of applicable sensing device may be adapted for use in this application.

The probe 47 extends through the portion of the water jacket 35 between the top wall 34 and the combustion chamber defining lower wall 18, extending into engagement with an upper surface 48 of the lower wall 18. Thus, relative motion of the lower wall 18 with respect to the top wall 34 is directly indicated by the sensor 40 through corresponding motion of the probe 47 relative to the body 42.

In operation, fuel charges admitted to the combustion chambers 20 by the intake valves 38 through the intake ports 24 are intermittently burned in a predetermined engine cycle timed with piston reciprocation, exhaust products being discharged through the exhaust ports 26. Pressure in the combustion chambers varies substantially during the events of intake, compression, combustion, expansion, and exhaust of the charge, with peak cylinder pressures occurring during combustion near the piston top dead center position shown in FIG. 1. The variations in pressure in the combustion chambers act against the lower wall 18, causing its deflection in an amount directly related to the instantaneous pressure differential. This deflection of the wall 18 at the location or locations where it is contacted by the probe 47 of a sensor 40 causes a corresponding motion of the probe 47 engaging the upper surface 48 of the wall. Movement of the probe 47 relative to the body 42 of the sensor 40 can then be used by connection of the sensor to an appropriate system, such as that disclosed in U.S. Pat. No. 4,153,019, previously referred to, to indicate the pressure and variations therein occurring within the combustion chamber for use in indicating or controlling functions of the engine as desired.

In responding directly to movement of the lower wall 18 relative to the top wall 34 of the cylinder head, the location of the sensor 40 opposite or closely adjacent to a combustion chamber maximizes the desired pressure indication by movement of the lower wall and minimizes the effects of other engine factors such as thermal distortion of the cylinder head and shock or inertia forces. Thus the arrangement provides a substantial advantage over prior arrangements in which direct contact with a combustion chamber defining wall is not utilized.

Figure 2:
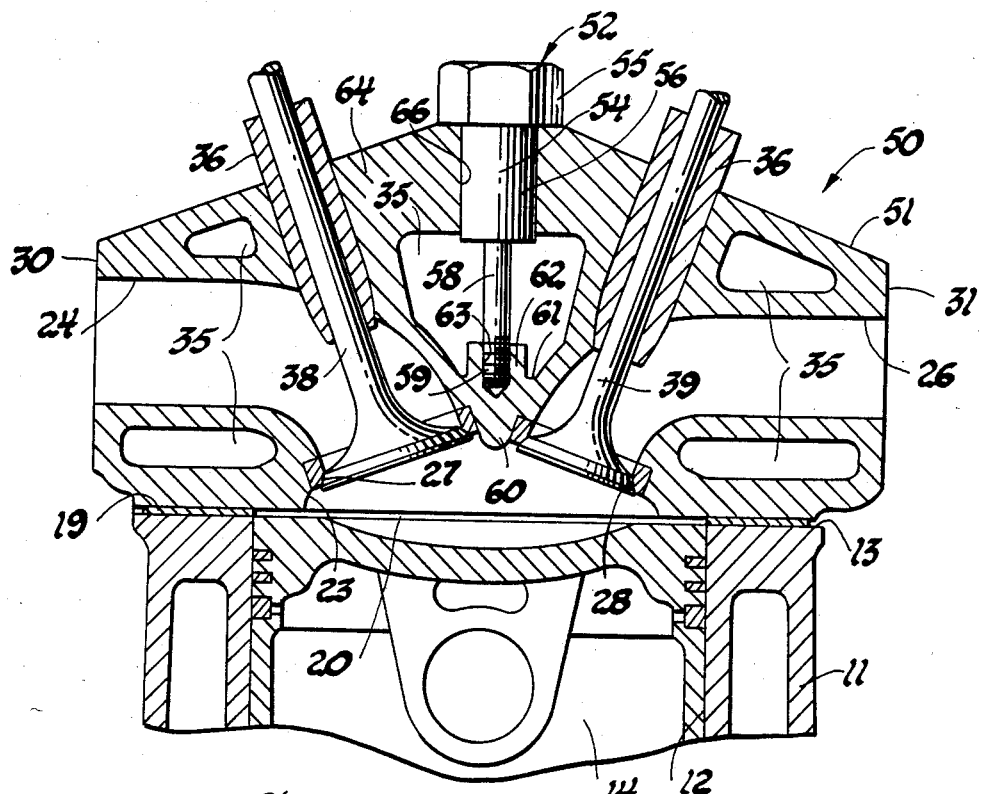

Referring now to FIG. 2 of the drawing, there is shown an alternative embodiment of internal combustion engine generally indicated by numeral 50. The components of engine 50 are in large part, identical to those of engine 10 of FIG. 1. Accordingly, description of these portions is unnecessary and like reference numerals have been used to designate like parts.

The engine 50 of FIG. 2 differs from that of FIG. 1 in the construction of portions of the cylinder head 51 and the piezoelectric combustion pressure sensor 52 mounted therein.

The sensor 52 includes a main body 54 having a hexagonal head 55 with a downwardly extending tubular portion 56, from which extends a probe 58 threaded at its distal end 59. As in the previous embodiment, the probe 58 is arranged within the body 54 to provide a signal in response to relative axial motion of the probe with respect to the body.

In the cylinder head, the combustion chamber defining lower wall 60 is provided on its upper side 61 with a boss 62 having an internally threaded opening 63, into which the end 59 of the probe 58 is threaded. The cylinder head top wall 64 has a smooth bore opening 66 through which the tubular portion 56 of the sensor 52 extends.

At installation, the sensor body and probe are rotated to thread the end 59 of the probe into the threaded opening 63 of the boss until the head 55 of the body engages the top wall 64 and a predetermined tensile stress is obtained which draws the probe 58 downwardly with respect to the body 54.

Subsequently, in operation, movement of the combustion chamber defining cylinder head lower wall 60, in response to combustion pressure variations in the combustion chamber 20, moves the probe 58, axially with movement of the wall and, thereby, causes relative motion between the probe 58 and body 54 of the sensor. This movement is measurable by the sensor and usable as an indication of combustion pressure in an associated circuit in the manner described with respect to the first mentioned embodiment.

Comparison of the arrangements of FIGS. 1 and 2 show their substantial similarity, except for the fact that the embodiment of FIG. 1 utilizes a sensor having an initially precompressed probe while the sensor of FIG. 2 utilizes an initially pretensioned probe.

Although both arrangements are shown with the probe mounted in a central location of their respective combustion chamber defining cylinder head walls, it should be recognized that changes could be made in mounting of the sensor and the point of contact of a combustion chamber defining wall by the probe without departing from the basic concept of direct sensor actuation by movement of a combustion chamber defining wall relative to another wall of an engine component. Thus, the probe might be located at another part of a combustion chamber defining cylinder head wall, that is at the side of, or actually adjacent, the combustion chamber, rather than centrally located therein, and still provide satisfactory pressure indicating deflection signals. Accordingly, it is intended that the invention not be limited to the embodiments described but that it have the full scope permitted by the language of the following claims.

The embodiments of the invention in which an exclusive property or privilege is claimed are defined as follows:

1. An internal combustion engine having at least one combustion chamber and comprising, in combination,
    a housing component including spaced first and second walls, said first wall substantially defining at least one side of the combustion chamber and being resiliently yieldable in response to varying pressure therein and said second wall being relatively rigid and located away from direct exposure to combustion chamber pressure, and the improvement comprising
    a sensor including a supporting body and a probe movable relative to the body to provide a readable signal for indicating and control functions, and
    means securing the body to one of the housing walls with the probe engaging the other of said walls such that relative motion of the walls due to pressure variations in the combustion chamber will directly cause signal generating motion of the probe relative to the sensor body.

2. An engine according to claim 1 wherein a coolant jacket is defined between the first and second walls and the probe extends within the coolant jacket to engage said other wall.

3. An engine according to claim 1 wherein the probe is mounted in compressive engagement with the first wall and the sensor is responsive to compressive forces applied to the probe.

4. An engine according to claim 1 wherein the probe is secured to said other wall under initial tension and the sensor is responsive to variations in tensile forces acting on the probe due to movement of the first wall caused by combustion chamber pressure variations.

5. An internal combustion engine having at least one cylinder closed at one end to define a combustion chamber and comprising, in combination,
   a housing component including spaced first and second walls, said first wall substantially defining at least said closed end of the cylinder and one side of the combustion chamber and being resiliently yieldable in response to varying pressure therein and said second wall being relatively rigid and located away from direct exposure to combustion chamber pressure, and the improvement comprising
   a sensor including a supporting body and a probe movable relative to the body to provide a readable signal for indicating and control functions, and
   means securing the body to one of the housing walls with the probe engaging the other of said walls such that relative motion of the walls due to pressure variations in the combustion chamber will directly cause signal generating motion of the probe relative to the sensor body.

6. An engine according to claim 5 wherein a coolant jacket is defined between the first and second walls and the probe extends within the coolant jacket to engage said other wall.

7. An engine according to claim 6 wherein the probe is mounted in compressive engagement with said other wall and the sensor is responsive to compressive forces applied to the probe.

8. An engine according to claim 6 wherein the probe is secured to said other wall under initial tension and the sensor is responsive to variations in tensile forces acting on the probe due to movement of the first wall caused by combustion chamber pressure variations.

9. An internal combustion engine comprising
   a block having at least one cylinder opening through a wall of the block,
   a cylinder head carried on said block, the cylinder head having a first wall bearing against said block wall and closing the end of the cylinder to define a combustion chamber at the closed end, and a second wall spaced from the first wall and defining a coolant chamber therebetween, said first wall being resiliently yieldable in response to varying pressure in the combustion chamber and said second wall being relatively rigid and isolated from direct exposure to combustion chamber pressure, and the improvement comprising
   a sensor including a supporting body and a probe movable relative to the body to provide a readable signal for indicating and control functions, and
   means securing the body to said second wall with the probe engaging said first wall such that relative motion of said cylinder head walls due to pressure variations in the combustion chamber will directly cause signal generating motion of the probe relative to the sensor body.

10. An engine according to claim 9 wherein the probe is mounted in compressive engagement with the first wall and the sensor is responsive to compressive forces applied to the probe.

11. An engine according to claim 9 wherein the probe is secured to said first wall under initial tension and the sensor is responsive to variations in tensile forces acting on the probe due to movement of the first wall caused by combustion chamber pressure variations.

* * * * *